United States Patent
Boyle

(10) Patent No.: US 8,194,341 B1
(45) Date of Patent: Jun. 5, 2012

(54) DISK DRIVE SEEDING DATA PATH PROTECTION WITH SYSTEM DATA SEED

(75) Inventor: William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/883,402

(22) Filed: Sep. 16, 2010

Related U.S. Application Data

(62) Division of application No. 12/727,127, filed on Mar. 18, 2010.

(51) Int. Cl.
*G11B 5/09* (2006.01)
*H03M 13/00* (2006.01)

(52) U.S. Cl. ............................ 360/53; 714/758; 714/785
(58) Field of Classification Search .................. None
See application file for complete search history.

(56) References Cited

U.S. PATENT DOCUMENTS

| | | | |
|---|---|---|---|
| 4,769,770 A | 9/1988 | Miyadera et al. |
| 5,613,066 A | 3/1997 | Matsushima et al. |
| 6,092,231 A | 7/2000 | Sze |
| 6,202,121 B1 | 3/2001 | Walsh et al. |
| 6,324,604 B1 | 11/2001 | Don et al. |
| 6,339,811 B1 | 1/2002 | Gaertner et al. |
| 6,574,774 B1 | 6/2003 | Vasiliev |
| 6,772,274 B1 | 8/2004 | Estakhri |
| 6,829,688 B2 | 12/2004 | Grubbs et al. |
| 6,886,068 B2 | 4/2005 | Tomita |
| 6,895,468 B2 | 5/2005 | Rege et al. |
| 6,901,479 B2 | 5/2005 | Tomita |
| 6,920,455 B1 | 7/2005 | Weschler |
| 6,967,810 B2 | 11/2005 | Kasiraj et al. |
| 7,155,448 B2 | 12/2006 | Winter |
| 7,412,585 B2 | 8/2008 | Uemura |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 7,516,267 B2 | 4/2009 | Coulson et al. |
| 7,529,880 B2 | 5/2009 | Chung et al. |
| 7,539,924 B1 | 5/2009 | Vasquez et al. |
| 7,603,530 B1 | 10/2009 | Liikanen et al. |
| 7,647,544 B1 | 1/2010 | Masiewicz |
| 7,669,044 B2 | 2/2010 | Fitzgerald et al. |

(Continued)

FOREIGN PATENT DOCUMENTS

WO 2009/102425 8/2009

OTHER PUBLICATIONS

Rosenblum, Mendel and Ousterhout, John K. (Feb. 1992), "The Design and Implementation of a Log-Structured File System." ACM Transactions on Computer Systems, vol. 10, Issue 1, pp. 26-52.

(Continued)

*Primary Examiner* — Daniell L Negron
*Assistant Examiner* — Regina N Holder

(57) ABSTRACT

A disk drive is disclosed comprising a head actuated over a disk comprising a plurality of data sectors. A redundancy generator is loaded with a first seed value corresponding to system data generated internal to the disk drive. First data path redundancy symbols are generated in response to the first seed value, and the system data and the first data path redundancy symbols are written to a first data sector. A syndrome generator is loaded with the first seed value to generate first syndromes when reading the system data and first data path redundancy symbols from the first data sector. The validity of the system data is verified in response to the first syndromes.

16 Claims, 10 Drawing Sheets

U.S. PATENT DOCUMENTS

| | | |
|---|---|---|
| 7,685,360 B1 | 3/2010 | Brunnett et al. |
| 7,840,878 B1 | 11/2010 | Tang et al. |
| 8,006,027 B1 | 8/2011 | Stevens et al. |
| 2004/0019718 A1 | 1/2004 | Schauer et al. |
| 2004/0109376 A1 | 6/2004 | Lin |
| 2005/0071537 A1 | 3/2005 | New et al. |
| 2005/0144517 A1 | 6/2005 | Zayas |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |

OTHER PUBLICATIONS

Rosenblum, "The Design and Implementation of a Log-structured File System", EECS Department, University of California, Berkeley, Technical Report No. UCB/CSD-92-696, Jun. 1992.

Office Action dated Sep. 20, 2011 from U.S. Appl. No. 12/727,127, 24 pages.

Amer, et al., "Design Issues for a Shingled Write Disk System", 26th IEEE Symposium on Massive Storage Systems and Technologies: Research Track (MSST 2010), May 2010, 12 pages.

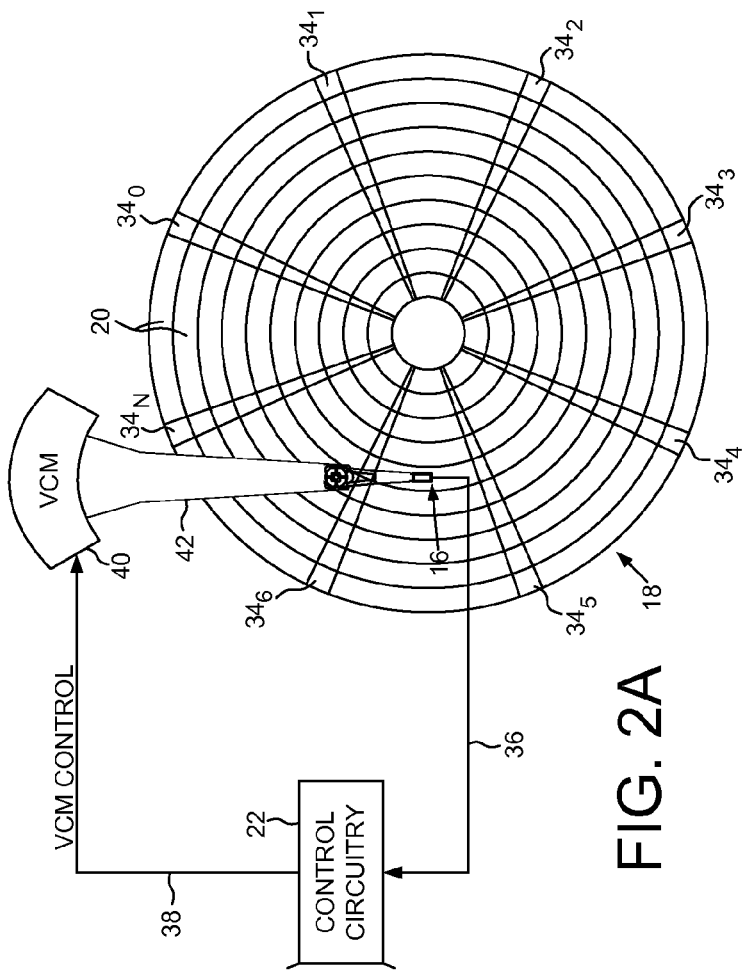
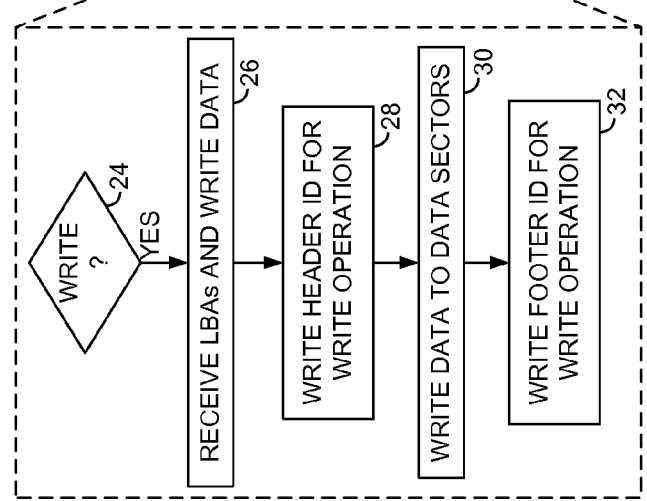
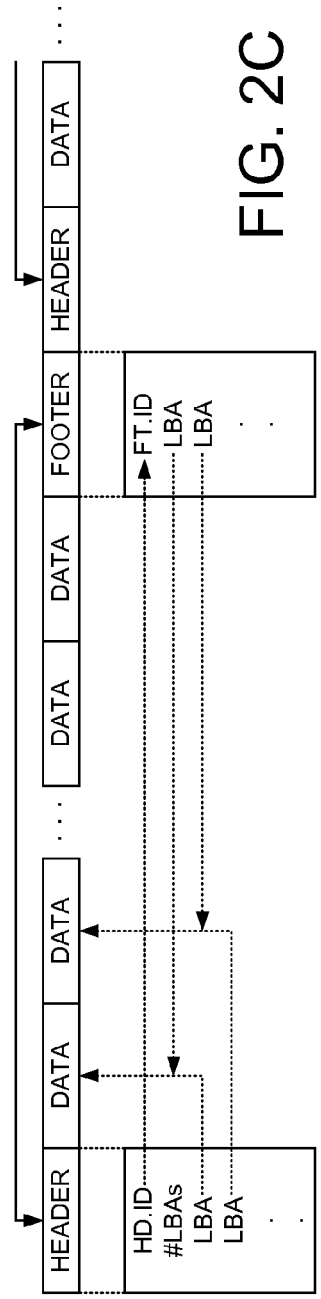
FIG. 2A
FIG. 2B
FIG. 2C

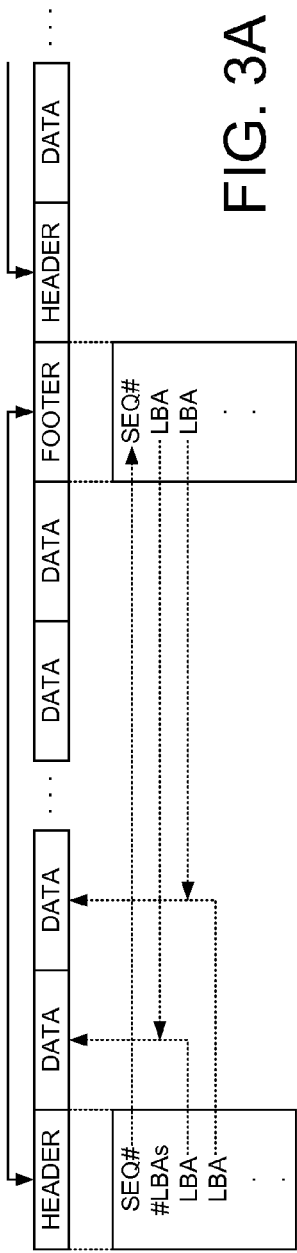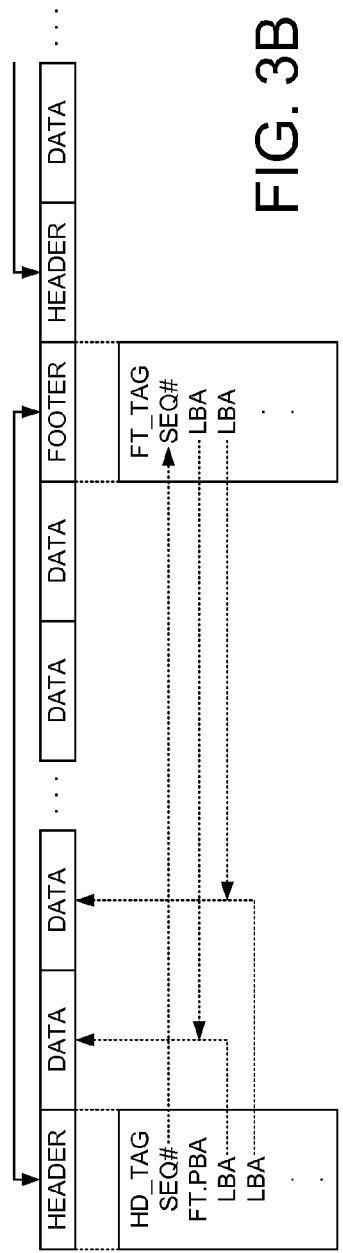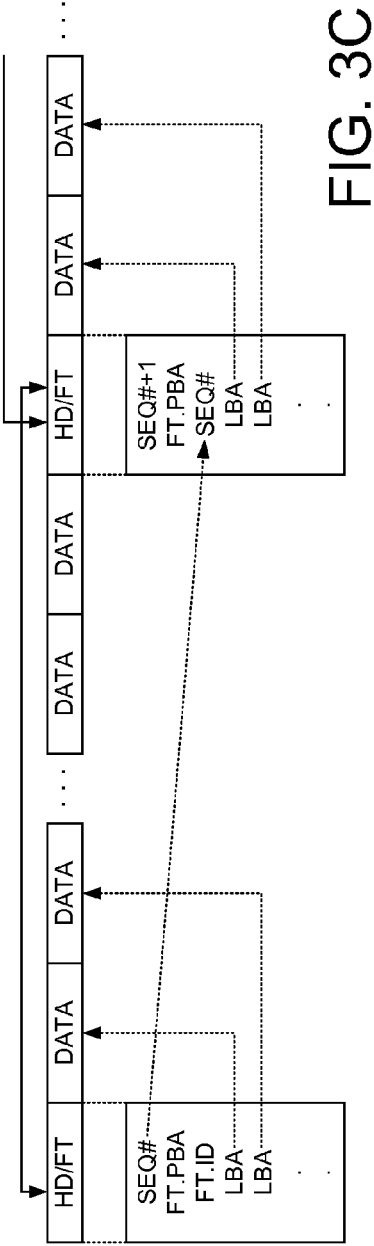

DISK DRIVE SEEDING DATA PATH PROTECTION WITH SYSTEM DATA SEED

CROSS-REFERENCE TO RELATED APPLICATIONS

This application is a divisional of co-pending application Ser. No. 12/727,127, filed Mar. 18, 2010.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 comprising a plurality of data tracks 4 defined by a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

BRIEF DESCRIPTION OF THE DRAWINGS

FIG. 2A shows a disk drive according to an embodiment of the present invention comprising a head actuated over a disk and control circuitry.

FIG. 2B is a flow diagram executed by the control circuitry wherein a header identifier and a footer identifier frame the write data of a write command according to an embodiment of the present invention.

FIG. 2C shows an embodiment of the present invention wherein the LBAs of the write command are written to a header data sector and a footer data sector to provide redundancy.

FIG. 3A shows an embodiment of the present invention wherein a sequence number of write commands is written to the header and footer data sectors.

FIG. 3B shows an embodiment of the present invention wherein a header tag is written to the header data sector, and the footer tag is written to the footer data sector.

FIG. 3C shows an embodiment of the present invention wherein the header identifier of a next write command is written in the footer data sector of a previous write command.

DETAILED DESCRIPTION OF EMBODIMENTS OF THE INVENTION

Figure 1:
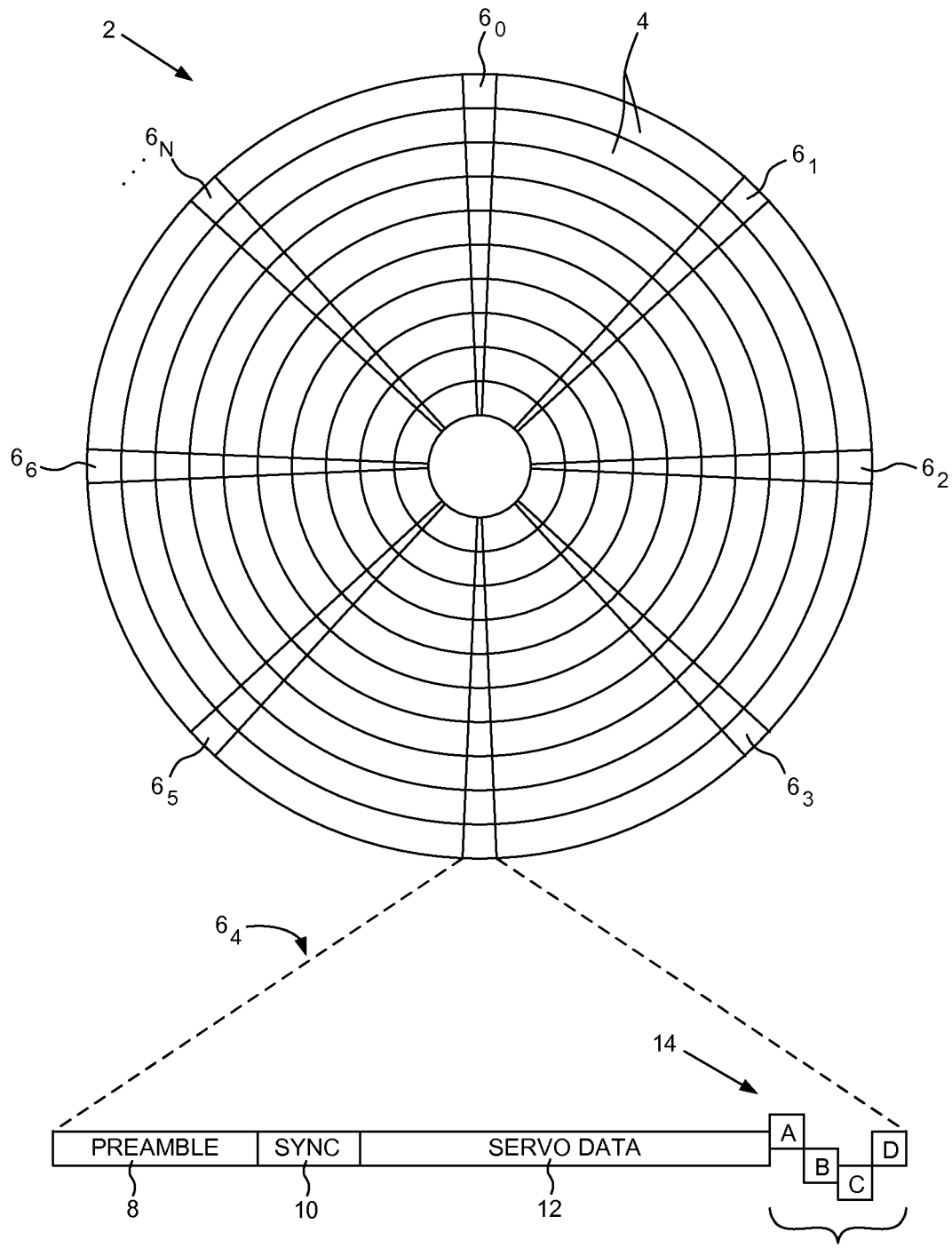
FIG. 1 shows a prior art disk format comprising a plurality of tracks defined by embedded servo sectors.

FIG. 2A shows a disk drive according to an embodiment of the present invention comprising a head 16 actuated over a disk 18 having a plurality of tracks 20, wherein each track comprises a plurality of data sectors each assigned a physical block address (PBA). The disk drive further comprises control circuitry 22 for executing the flow diagram of FIG. 2B. A first write command is received (step 24) identifying a number of logical block addresses (LBAs) and write data (step 26). A header identifier is written to a first data sector that identifies a beginning of the first write command (step 28). The write data is written to a plurality of the data sectors (step 30) and after writing the write data, a footer identifier is written to a second data sector that identifies the end of the first write command (step 32). The LBAs are also written to at least one of the first data sector and the second data sector.

In the embodiment of FIG. 2A, the plurality of tracks 20 are defined by a plurality of embedded servo sectors $34_0$-$34_N$. The control circuitry 22 processes the read signal 36 emanating from the head 16 to demodulate the servo sectors $34_0$-$34_N$ and generate a position error signal (PES) representing an error between the detected position of the head and a target position relative to a target track. The control circuitry 22 filters the PES using a suitable compensation filter to generate a control signal 38 applied to a voice coil motor (VCM) 40 which rotates an actuator arm 42 about a pivot in order to actuate the head 16 radially over the disk in a direction that reduces the PES.

In one embodiment, the control circuitry accesses at least part of the disk using log structured writes wherein a band of the data tracks are accessed as a circular buffer. New data is written to the head of the buffer (current data track), and during a garbage collection operation, valid data is relocated from the tail of the buffer (old data tracks) to the head of the buffer so as to free space for new write data. Log structured writes may be employed, for example, when the data tracks are written in a shingled manner. Shingled writing increases the capacity of the disk by allowing the data tracks to overlap, thereby increasing the tracks per inch (TPI). To prevent inter-track interference, the tracks are written sequentially in one direction (e.g., from the outer diameter toward the inner diameter of the disk) so that a previously written track is overwritten only by the next adjacent track. Accessing the data tracks as a circular buffer means that the LBAs are constantly re-assigned to different PBAs of the current track being written. Accordingly, an LBA to PBA map must be maintained to account for the continuous remapping of LBAs to PBAs inherent in a log structured system.

FIG. 2C illustrates an embodiment of the present invention wherein the LBAs of a write command are written to both a header data sector and a footer data sector, wherein each LBA corresponds to one of the data sectors of the write command. Writing the LBAs to both the header data sector and footer data sector provides redundancy in the event that either the header or footer data sector is unrecoverable. Also in the embodiment of FIG. 2C, a header identifier (HD.ID) is written to the header data sector together with the number of data sectors written (#LBAs) in the write command. The number of LBAs written is a footer locator that identifies the footer data sector (e.g., the footer data sectors may equal the #LBAs plus the PBA of the header data sector). A footer identifier (FT.ID) is written to the footer data sector which provides a verification that the data sector is a valid footer that corresponds to the header (an invalid footer may occur due to a power failure in the middle of a write operation).

FIG. 3A illustrates an embodiment of the present invention wherein the header identifier and footer identifier comprise a sequence number of the write operation such that the footer corresponds to the header only if they both contain the same sequence number. If a power failure occurs in the middle of a write operation, the footer data sector will not contain the correct sequence number, and therefore the LBA to PBA map will not be updated as described below. A maximum sequence number is selected relative to the maximum possible number of write operations within the circular buffer of tracks to ensure a new sequence number cannot correlate with an old sequence number (e.g., due to a power failure).

FIG. 3B illustrates an embodiment of the present invention wherein the header data sector comprises a header tag (HD_TAG) that identifies the data sector as a header, and the footer data sector comprises a footer tag (FT_TAG) that identifies the data sector as a footer data sector. The tags help prevent a data sector storing user data from being confused with a header/footer data sector. For example, if there is a power failure in the middle of a write operation that prevents the footer data sector from being written, the footer data sector will contain old user data (invalid data). However, the footer tag will likely not be correct nor will the sequence number, so the data sector will not be recognized as a valid footer when updating the LBA to PBA map as described below.

FIG. 3B illustrates another embodiment of the present invention wherein the footer locator stored in the header data sector comprises the PBA of the footer data sector (FT.PBA). That is, the PBA for the footer data sector is predetermined and stored in the header data sector at the beginning of the write operation.

FIG. 3C illustrates an embodiment of the present invention wherein the header data for a current write operation is stored with the footer data of the previous write operation in a single data sector to increase the format efficiency. In the example shown, the LBAs of a current write command are stored with the header data. When a new write command is received, the footer data of the previous write command is combined with the header data of the new write command and the old header/footer data sector is overwritten. This embodiment reduces by half the number of data sectors needed to store the header/footer data for all write commands to the circular buffer.

Figure 4A:
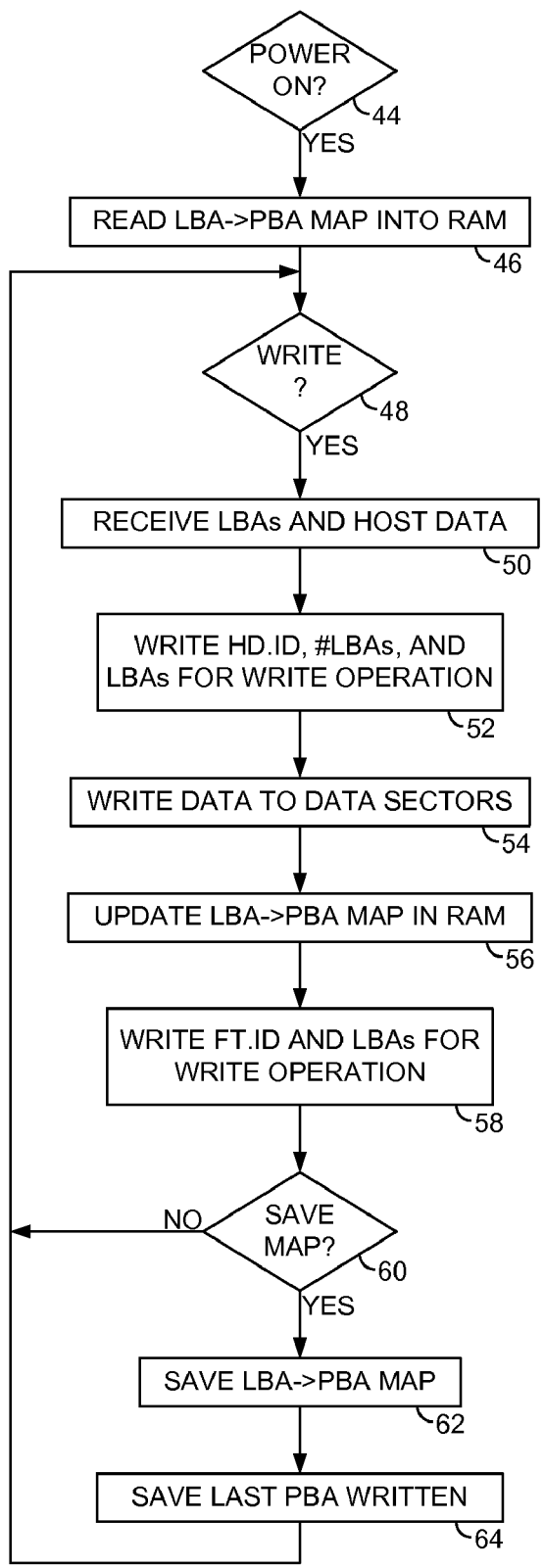
FIG. 4A is a flow diagram according to an embodiment of the present invention wherein a LBA to PBA map is maintained and periodically saved to a non-volatile memory together with the last PBA written.

FIG. 4A is a flow diagram according to an embodiment of the present invention wherein when the disk drive is powered on (step 44) an LBA to PBA map is read from a non-volatile memory (step 46). When a write command is received from the host (step 48), the LBAs to be written together with the write data is received from the host (step 50). The header data for the write command is written to the header data sector (step 52), the write data is written to the following data sectors (step 54), the LBA to PBA map is updated in volatile memory (step 56), and then the footer data is written to the footer data sector (step 58). Periodically the updated LBA to PBA map stored in volatile memory is saved in a non-volatile memory (e.g., on the disk or in a non-volatile semiconductor memory). When it is time to save the LBA to PBA map (step 60), the LBA to PBA map is saved to the non-volatile memory (step 62) together with the last written PBA (i.e., the last footer data sector written). As described in greater detail below, the last PBA written is used to recover from a power failure to determine the last footer data sector written prior to saving the updated LBA to PBA map.

Figure 4B:
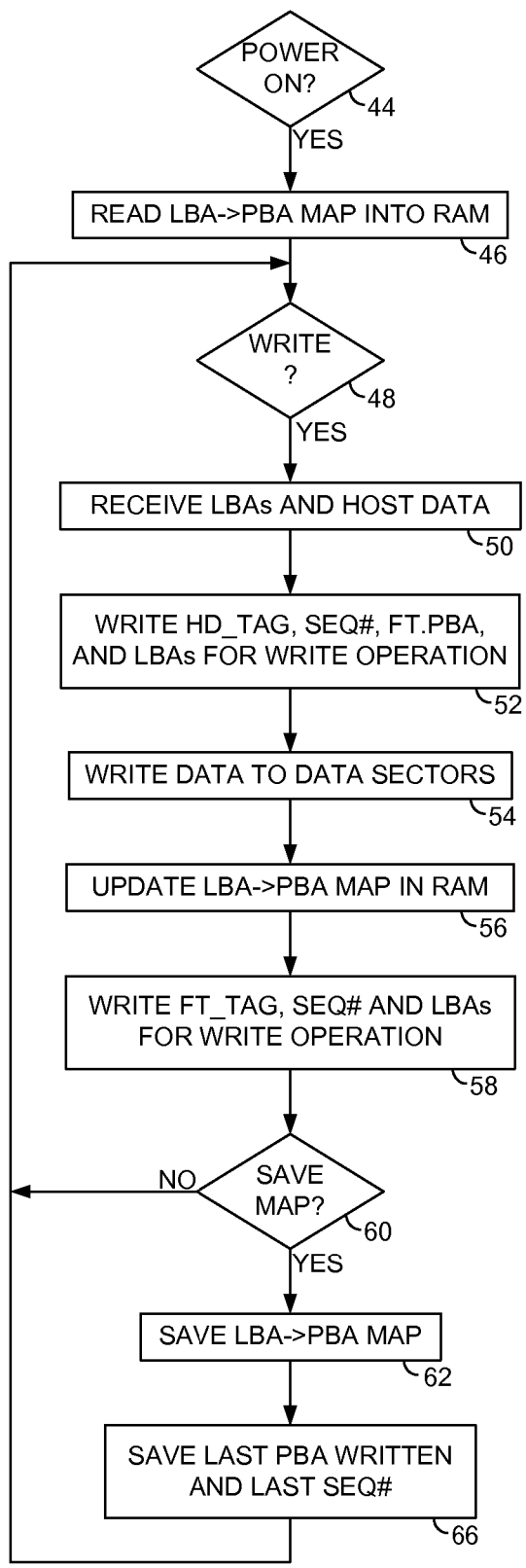
FIG. 4B is a flow diagram according to an embodiment of the present invention wherein a LBA to PBA map is maintained and periodically saved to a non-volatile memory together with the last PBA written and the last sequence number of the last write operation.

FIG. 4B is a flow diagram according to an embodiment of the present invention wherein when the LBA to PBA map is saved (step 62), the sequence number of the last write operation is also saved with the PBA of the last data sector written (step 66). As described in greater detail below, saving the last sequence number helps verify the header/footer data sectors when updating the LBA to PBA map after a power failure.

Figure 5A:
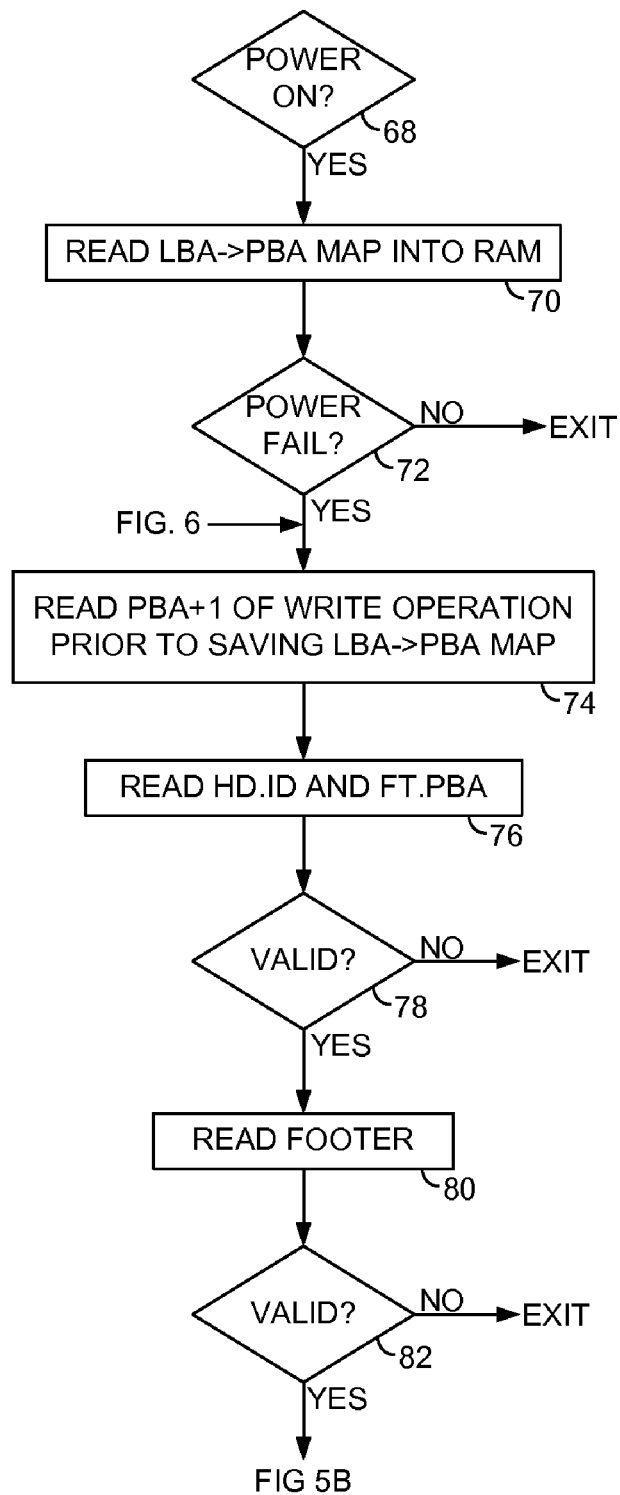
FIGS. 5A and 5B are flow diagrams according to an embodiment of the present invention wherein a LBA to PBA map is updated during a power-on sequence using the mapping data stored in the header and footer data sectors.
Figure 5B:
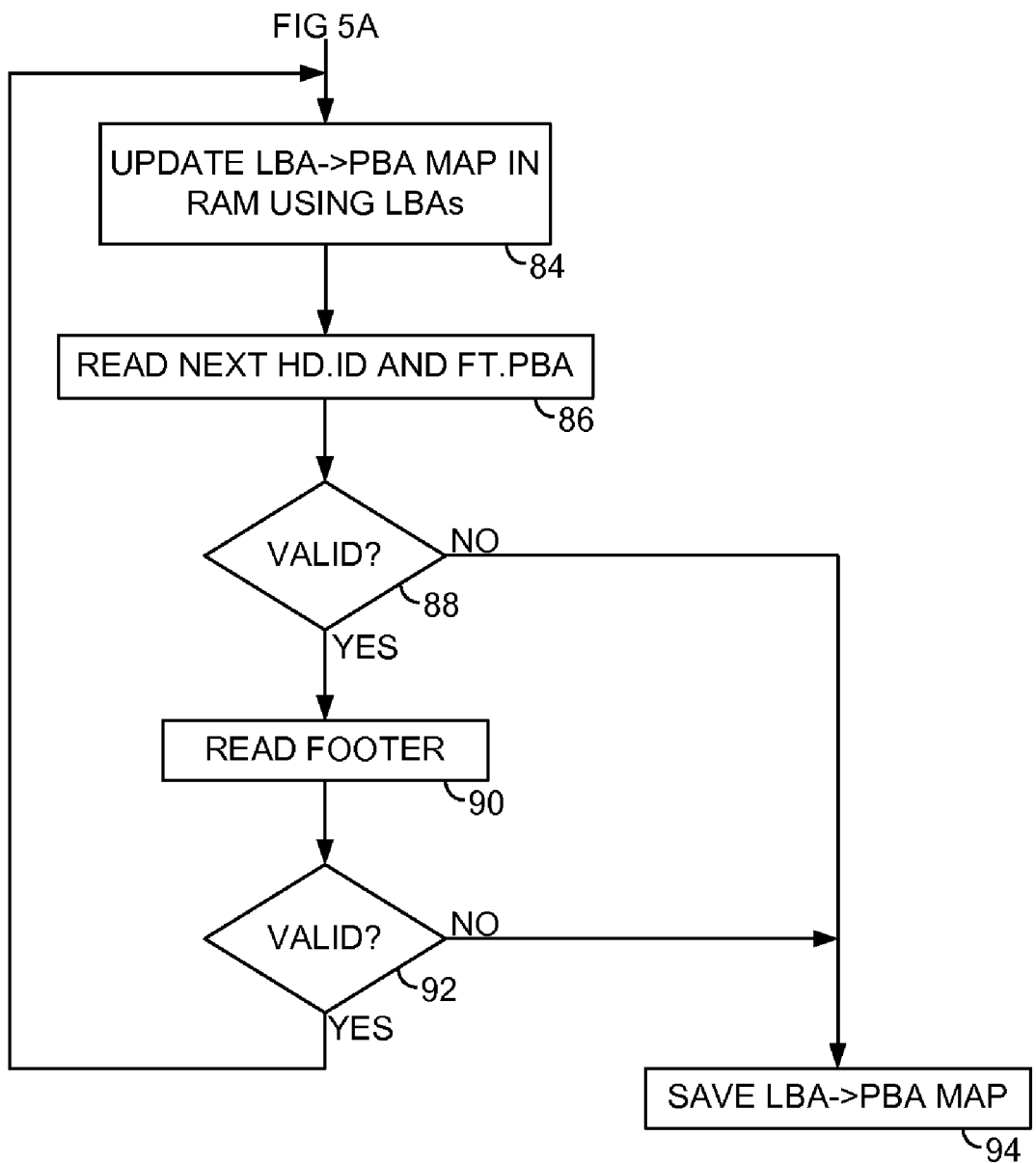

FIGS. 5A and 5B show a flow diagram according to an embodiment of the present invention for updating the LBA to PBA map after a power failure using the header/footer data sectors. When the disk drive is powered on (step 68), the last saved LBA to PBA map is read from the non-volatile memory (step 70). If a power failure occurred previously (step 72), the data sector following the last written data sector prior to saving the LBA to PBA map is read (step 74). In this embodiment, this data sector stores the header data for the subsequent write operation (if one was executed) after the last save of the LBA to PBA map. The header data including the header identifier and the footer PBA are read from the header data sector and evaluated to determine whether they are valid (step 78). If they are valid (step 78), the footer data sector is read (step 80). If the footer data sector is valid (step 82) the LBA to PBA map is updated using the LBAs stored in the header and/or footer data sector (step 84 of FIG. 5B). The next data sector is then read which is the header data sector for the next write operation (step 86). The header identifier and the footer PBA are read (step 86) and if valid (step 88) the corresponding footer data sector is read (step 90). If the footer data sector is valid (step 92), the LBA to PBA map is updated using the LBAs stored in the header and/or footer data sector (step 84) and the process continues until an invalid header or footer data sector is detected. The updated LBA to PBA map is then saved to the non-volatile memory (step 94).

In one embodiment, if a valid header data sector is read but the corresponding footer data sector is invalid, it means the last write command was interrupted by the power failure. In one embodiment, when this condition is detected, the successfully written data sectors may still be recovered by updating the LBA to PBA map using any suitable technique. For example, in one embodiment the LBA of a written data sector may be stored in each data sector and used to update the LBA to PBA map. During power failure, the PBA of the last data sector successfully written may be saved in non-volatile memory to identify where the write operation was interrupted. In yet another embodiment, the write data of an interrupted write operation may be cached in a non-volatile memory (e.g., on the disk or in a non-volatile semiconductor memory). After updating the LBA to PBA map up to the last valid header/footer pair, the write command interrupted during the power failure may be re-executed and the LBA to PBA map updated accordingly (FIG. 4A).

Figure 6:
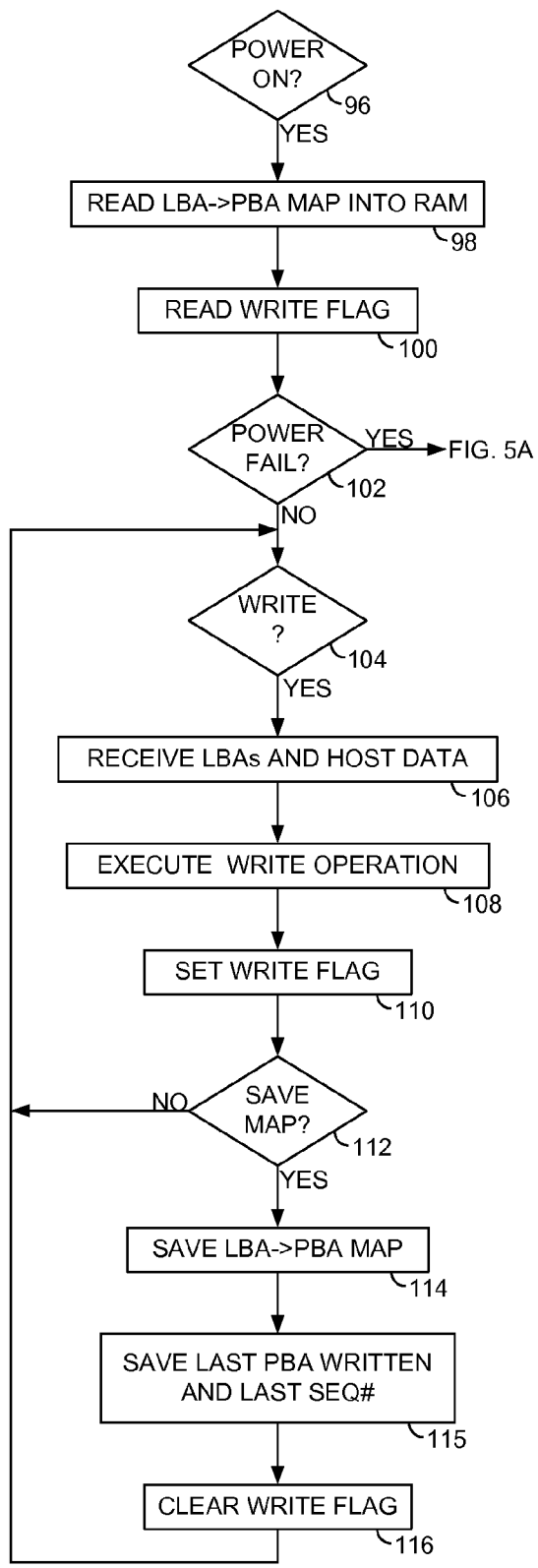
FIG. 6 is a flow diagram according to an embodiment of the present invention wherein a write flag is set after a write operation and cleared after saving the LBA to PBA map to the non-volatile memory.

FIG. 6 is a flow diagram according to an embodiment of the present invention wherein a write flag is maintained to determine when the LBA to PBA map should be updated due to a power failure. When the disk drive is powered on (step 96), the last saved LBA to PBA map is read from the non-volatile memory (step 98) as well as a write flag (step 100). If the write flag is set (step 102), the LBA to PBA map is updated using the header/footer data sectors (FIGS. 5A and 5B) and the write flag is cleared (not shown). When a new write command is received (step 104) the LBAs and write data are received from the host (step 106) and the write operation is executed (step 108). The write flag is set (step 110) to indicate that new write commands have been executed prior to saving the LBA to PBA map to the non-volatile memory. When it is time to save the LBA to PBA map to non-volatile memory (step 112), the LBA to PBA map is saved (step 114), the last written PBA and the last sequence number are saved (step 115) and the write flag is cleared (step 116). Each time the write flag toggles, the write flag is also saved in the non-volatile memory.

In the embodiments of the present invention, it is important to ensure valid header/footer data sectors are distinguished from data sectors storing user data. For example, the header identifier and footer identifier must correlate, the header tag and footer tag must be valid, and any redundant data stored in both the header and footer data sectors (e.g., the LBAs) must match. In another embodiment, a data path protection algorithm is employed to further ensure that a valid header and/or footer data sector is being read when updating the LBA to PBA map. A data path protection algorithm is conventionally used to ensure user data is written to and read from the correct data sector by seeding a redundancy generator/syndrome generator of an error detection code (e.g., Cyclic Redundancy Check (CRC) code) with the LBAs of a write command. In an embodiment of the present invention, the header and footer data sectors store system data, and therefore instead of seeding the redundancy/syndrome generator with an LBA, they are loaded with a special seed value that identifies the type of system data sector (e.g., header or footer seed). This helps verify a data sector is a particular type of system data sector (e.g., header or footer) during read operations to avoid confusion with a user data sector due to a system error (e.g., a power failure).

Figure 7:
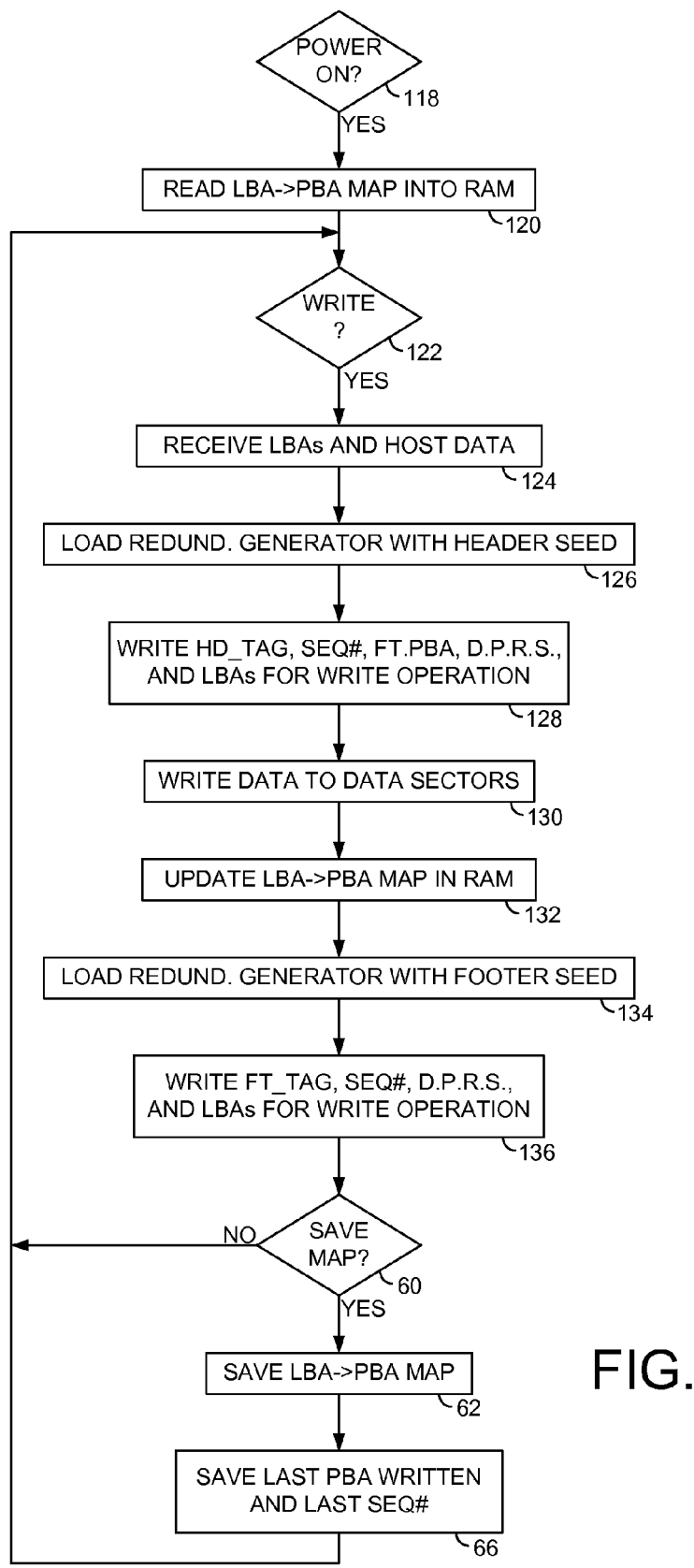
FIG. 7 is a flow diagram according to an embodiment of the present invention wherein during a write operation, a header seed and a footer seed are loaded into a redundancy generator when writing the header data sector and the footer data sector.

This embodiment is understood with reference to FIG. 7, wherein when the disk drive is powered on (step 118), the LBA to PBA map is read from the non-volatile memory (step 120). When a write command is received (step 122), the LBAs and write data are received from the host (step 124). A redundancy generator (e.g., a CRC redundancy generator) is then loaded with a header seed (e.g., the header tag) in order to generate data path redundancy symbols (step 126). The header tag, sequence number, footer PBA, data path redundancy symbols, and the LBAs of the write operation are written to the header data sector (step 128). The write data is then written to the following data sectors (step 130) and the LBA to PBA map is updated in volatile memory (step 132). The redundancy generator is loaded with a footer seed (e.g., the footer tag) in order to generate data path redundancy symbols (step 134). The footer tag, sequence number, data path redundancy symbols, and the LBAs of the write operation are written to the footer data sector (step 136).

Figure 8A:
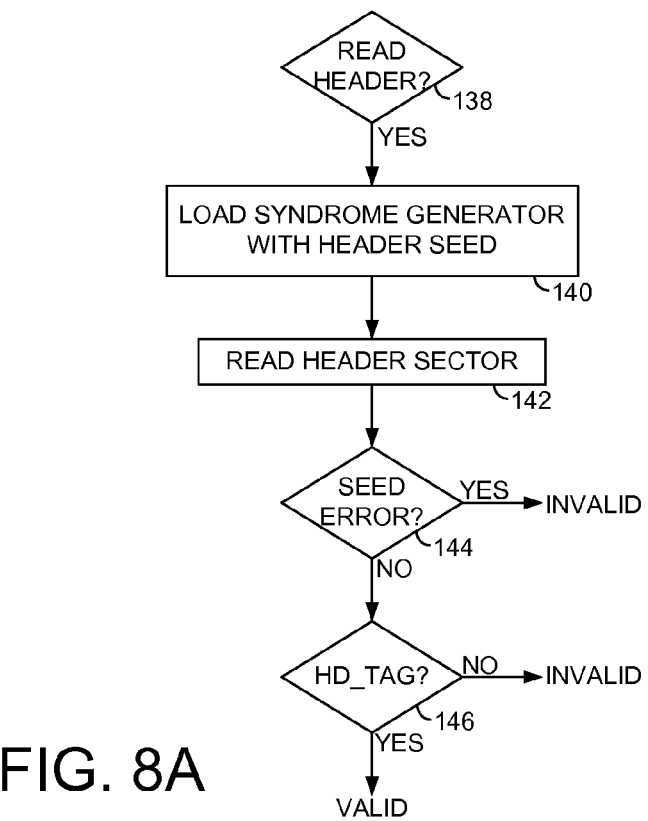
FIGS. 8A and 8B are flow diagrams according to an embodiment of the present invention wherein during a read operation, a header seed and a footer seed are loaded into a syndrome generator when reading the header data sector and the footer data sector.

FIG. 8A is a flow diagram according to an embodiment of the present invention wherein prior to reading a header data sector (step 138) a syndrome generator (e.g., a CRC syndrome generator) is loaded with the header seed to generate corresponding syndromes (step 140). The header data sector is then read, including the redundancy symbols which are checked against the syndromes to verify that the header data sector is valid with respect to data path protection (step 144). If a data path protection error is not detected (step 144), the header tag is evaluated to further verify that the header data sector is valid (step 146).

Figure 8B:
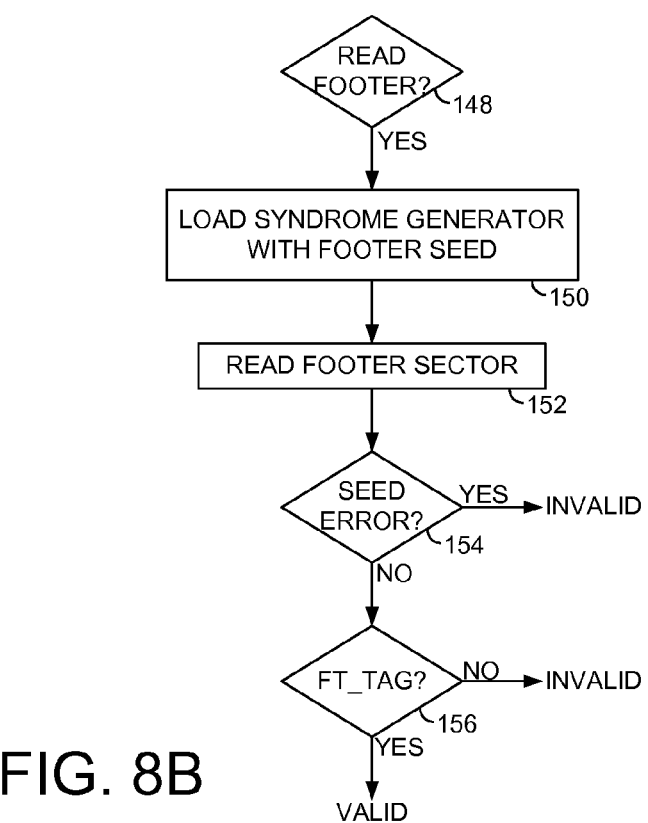

FIG. 8B is a flow diagram according to an embodiment of the present invention wherein prior to reading a footer data sector (step 148) a syndrome generator (e.g., a CRC syndrome generator) is loaded with the footer seed to generate corresponding syndromes (step 150). The footer data sector is then read, including the redundancy symbols which are checked against the syndromes to verify that the footer data sector is valid with respect to the data path protection (step 154). If a data path protection error is not detected (step 154), the footer tag is evaluated to further verify that the footer data sector is valid (step 156).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data sectors;
   a head actuated over the disk; and
   control circuitry operable to:
      load a redundancy generator with a first seed value corresponding to system data generated internal to the disk drive;
      generate first data path redundancy symbols in response to the first seed value;
      write the system data and the first data path redundancy symbols to a first data sector;
      load a syndrome generator with the first seed value;

generate first syndromes when reading the system data and first data path redundancy symbols from the first data sector; and verify the validity of the system data in response to the first syndromes.

2. The disk drive as recited in claim 1, wherein:

the first seed value comprises a system data identifier; and the control circuitry is operable to write the system data identifier to the first data sector.

3. The disk drive as recited in claim 2, wherein the system data identifier identifies a header data sector written to the disk to mark a beginning of a write command.

4. The disk drive as recited in claim 2, wherein the system data identifier identifies a footer data sector written to the disk to mark an end of a write command.

5. The disk drive as recited in claim 1, wherein the control circuitry is further operable to:

load the redundancy generator with a second seed value corresponding to user data received from a host, wherein the first seed value is different than the second seed value;

generate second data path redundancy symbols in response to the second seed value;

write the user data and the second data path redundancy symbols to a second data sector;

load the syndrome generator with the second seed value;

generate second syndromes when reading the user data and second data path redundancy symbols from the second data sector; and verify the validity of the user data in response to the second syndromes.

6. The disk drive as recited in claim 5, wherein the second seed value corresponds to a logical block address received from the host and assigned to the user data.

7. The disk drive as recited in claim 5, wherein the redundancy generator is operable to generate the first and second data path redundancy symbols according to an error detection code.

8. The disk drive as recited in claim 7, wherein the error detection code comprises a cyclic redundancy code.

9. A method of operating a disk drive, the disk drive comprising a head actuated over a disk drive comprising a plurality of data sectors, the method comprising:

loading a redundancy generator with a first seed value corresponding to system data generated internal to the disk drive;

generating first data path redundancy symbols in response to the first seed value;

writing the system data and the first data path redundancy symbols to a first data sector;

loading a syndrome generator with the first seed value;

generating first syndromes when reading the system data and first data path redundancy symbols from the first data sector; and verifying the validity of the system data in response to the first syndromes.

10. The method as recited in claim 9, wherein:

the first seed value comprises a system data identifier; and the method further comprises writing the system data identifier to the first data sector.

11. The method as recited in claim 10, wherein the system data identifier identifies a header data sector written to the disk to mark a beginning of a write command.

12. The method as recited in claim 10, wherein the system data identifier identifies a footer data sector written to the disk to mark an end of a write command.

13. The method as recited in claim 9, further comprising:

loading the redundancy generator with a second seed value corresponding to user data received from a host, wherein the first seed value is different than the second seed value;

generating second data path redundancy symbols in response to the second seed value;

writing the user data and the second data path redundancy symbols to a second data sector;

loading the syndrome generator with the second seed value;

generating second syndromes when reading the user data and second data path redundancy symbols from the second data sector; and verifying the validity of the user data in response to the second syndromes.

14. The method as recited in claim 13, wherein the second seed value corresponds to a logical block address received from the host and assigned to the user data.

15. The method as recited in claim 13, further comprising generating the first and second data path redundancy symbols according to an error detection code.

16. The method as recited in claim 15, wherein the error detection code comprises a cyclic redundancy code.

* * * * *